(12) United States Patent
Balooch et al.

(10) Patent No.: US 12,514,492 B2
(45) Date of Patent: Jan. 6, 2026

(54) SYSTEMS, DEVICES AND METHODS FOR DISPENSING PERSONALIZED PRODUCTS INCLUDING PHYSIOLOGICAL CYCLE PROGRESSION AND PERSONALIZED SKINCARE RECOMMENDATION

(71) Applicant: L'Oreal, Paris (FR)

(72) Inventors: Guive Balooch, New York, NY (US); Camille Kroely, Paris (FR)

(73) Assignee: L'Oreal, Paris (FR)

( * ) Notice: Subject to any disclaimer, the term of this patent is extended or adjusted under 35 U.S.C. 154(b) by 1023 days.

(21) Appl. No.: 17/581,606

(22) Filed: Jan. 21, 2022

(65) Prior Publication Data

US 2022/0249012 A1      Aug. 11, 2022

Related U.S. Application Data

(60) Provisional application No. 63/139,835, filed on Jan. 21, 2021.

(30) Foreign Application Priority Data

Apr. 7, 2021   (FR) ...................... 2103547

(51) Int. Cl.
*A61B 5/00* (2006.01)
*A45D 44/00* (2006.01)
(Continued)

(52) U.S. Cl.
CPC .............. *A61B 5/441* (2013.01); *A45D 44/00* (2013.01); *G06Q 30/0631* (2013.01); *G16H 50/20* (2018.01); *A45D 2044/007* (2013.01)

(58) Field of Classification Search
CPC .................. A61B 5/441–447; A45D 2044/007
See application file for complete search history.

(56) References Cited

U.S. PATENT DOCUMENTS

| 10,660,425 B2 | 5/2020 | Yamanashi et al. |
| 2011/0301441 A1 | 12/2011 | Bandic et al. |

(Continued)

FOREIGN PATENT DOCUMENTS

| DE | 102013101751 B4 | 5/2016 |
| EP | 3384855 A1 | 10/2018 |

(Continued)

OTHER PUBLICATIONS

International Preliminary Report on Patentability mailed Aug. 3, 2023, issued in corresponding International Application No. PCT/US2022/013401, filed Jan. 21, 2022, 9 pages.

(Continued)

*Primary Examiner* — Thaddeus B Cox
(74) *Attorney, Agent, or Firm* — Christensen O'Connor Johnson Kindness PLLC

(57) ABSTRACT

Systems, devices, and methods are described for generate at least one instances of a skin state and at least one instances of a personalized skincare recommendation responsive to receiving one or more inputs indicative of a predicted physiological cycle progression. The system includes a mitigation unit including computational circuitry configured to generate a personalized skincare recommendation responsive to one or more inputs indicative of the onset of the change in the skin state; and a skin-state display unit including computational circuitry configured to generate one or more instances of the skin state and one or more instances of a personalized skincare recommendation.

22 Claims, 3 Drawing Sheets

(51) Int. Cl.
*G06Q 30/0601* (2023.01)
*G16H 50/20* (2018.01)

(56) References Cited

U.S. PATENT DOCUMENTS

| | | | |
|---|---|---|---|
| 2012/0321759 A1* | 12/2012 | Marinkovich | A61B 5/442 |
| | | | 356/402 |
| 2015/0144653 A1 | 5/2015 | Kline et al. | |
| 2016/0000209 A1* | 1/2016 | Yamanashi | G06T 11/00 |
| | | | 600/300 |
| 2016/0066894 A1 | 3/2016 | Barton-Sweeney | |
| 2019/0125258 A1 | 5/2019 | Miller et al. | |
| 2019/0188809 A1* | 6/2019 | Jung | G06Q 50/04 |
| 2020/0260840 A1* | 8/2020 | Dedewo | B01F 29/10 |
| 2020/0281340 A1* | 9/2020 | Matsuda | A61K 8/02 |
| 2020/0381123 A1* | 12/2020 | Dryer | A61B 5/4288 |
| 2021/0076807 A1 | 3/2021 | Pack et al. | |
| 2022/0051794 A1 | 2/2022 | Dattner | |
| 2022/0051806 A1 | 2/2022 | Mizumoto et al. | |

FOREIGN PATENT DOCUMENTS

| | | | | |
|---|---|---|---|---|
| JP | 2000051154 A | 2/2000 | | |
| JP | 2002177224 A | 6/2002 | | |
| JP | 2003159221 A | 6/2003 | | |
| JP | 2007008912 A | 1/2007 | | |
| JP | 2013186814 A | 9/2013 | | |
| JP | 2014166218 A | 9/2014 | | |
| WO | 2014147940 A1 | 9/2014 | | |
| WO | WO-2018164905 A1 * | 9/2018 | | A45D 44/005 |
| WO | WO-2019136354 A1 * | 7/2019 | | G06F 18/41 |
| WO | WO2020130103 A1 | 6/2020 | | |
| WO | 2020261527 A1 | 12/2020 | | |

OTHER PUBLICATIONS

Office Action received Nov. 11, 2024, issued in Japanese Application No. 2023-544125, filed Jan. 21, 2022, 16 pages.
Office Action received Dec. 16, 2024, issued in U.S. Appl. No. 17/581,800, filed Jan. 21, 2022, 52 pages.
Office Action received Nov. 18, 2024, issued in Japanese Application No. 2023-544124, filed Jan. 21, 2022, 9 pages.
"Recurring Acne: Why does acne occur before menstruation?" PAIR Pure Skin Lab [online], Oct. 2017, <https://web.archive.org/web/20171011225528/https://pair.lion.co.jp/article/type/007_period.htm>; 13 pages.
"Postpartum care at Shinto Women's Clinic, a Obstetrics and Gynecology Clinic!" Shinto Women's Clinic [online], Sep. 2019, <https://web.archive.org/web/20201124182307/https://www.shinto-clinic.jp/blog750>, 19 pages.
"Changes in body shape due to female hormones," Tokyo Cosmetic Surgery [online], Sep. 2024, <https://web.archive.org/web/20201027095149/https://www.tkc110.jp/bust/3080.html>, 12 pages.
International Preliminary Report on Patentability mailed Aug. 3, 2023, issued in International Application No. PCT/US2022/013406, filed Jan. 21, 2022, 10 pages.
Preliminary Search Report mailed Dec. 13, 2021, issued in French Application No. 2103549, filed Apr. 7, 2021, 3 pages.
Written Opinion mailed mailed Dec. 13, 2021, issued in French Application No. 2103549, filed Apr. 7, 2021, 6 pages.
Office Action received May 19, 2024, issued in Japanese Application No. 2023-544124, filed Jan. 21, 2022, 11 pages.
International Search Report and Written Opinion mailed May 6, 2022, issued in corresponding International Application No. PCT/US2022/013401, filed Jan. 21, 2022, 16 pages.
Preliminary Search Report mailed Dec. 8, 2021, issued in corresponding French Application No. 2103547, filed Apr. 7, 2021, 2 pages.
Yuan, L., et al., "A deep learning system for differential diagnosis of skin disease," Nature Medicine, vol. 2015, No. 01, Jun. 1, 2020, pp. 1-73.
Written Opinion mailed Dec. 8, 2021, issued in corresponding French Application No. 2103547, filed Apr. 7, 2021, 5 pages.
Parc, "Enabling Smarter Skin Care with Machine Learning," <https://www.parc.com/wp-content/uploads/2018/06/Olay-PARC_CaseStudy_08.19.19.pdf>, Aug. 21, 2019, pp. 1-3.
Helloclue.com, "Clue Period and Ovulation Tracker with Ovulation Calendar for IOS, Android, and watchOS", 2023, pp. 1-10, Retrieved from the Internet: URL: https://helloclue.com/ [retrieved on Oct. 3, 2023].
Office Action received May 9, 2025, issued in U.S. Appl. No. 17/581,803, filed Jan. 21, 2022, 37 pages.

* cited by examiner

SYSTEMS, DEVICES AND METHODS FOR DISPENSING PERSONALIZED PRODUCTS INCLUDING PHYSIOLOGICAL CYCLE PROGRESSION AND PERSONALIZED SKINCARE RECOMMENDATION

CROSS-REFERENCES TO RELATED APPLICATIONS

This application claims the benefit of U.S. Provisional Application No. 63/139,835, filed Jan. 21, 2021, and French Application No. 2103547, filed Apr. 7, 2021, the disclosures of which are each expressly incorporated herein by reference in their entirety.

SUMMARY

In an aspect, the present disclosure is directed to, among other things, a system for managing a user experience including physiological cycle progression and personalized skincare recommendation. In an embodiment, the system includes a skin-state unit including computational circuitry configured to determine an onset of a change in a skin state responsive to one or more inputs indicative of a physiological cycle progression. In an embodiment, the system includes a mitigation unit including computational circuitry configured to generate a personalized skincare recommendation responsive to one or more inputs indicative of the onset of the change in the skin state. In an embodiment, the system includes a skin-state display unit including computational circuitry configured to generate one or more instances of the skin state and one or more instances of the personalized skincare recommendation. In an embodiment, the system includes a graphic user interface unit including computational circuitry configured to generate a virtual input display including one or more instances of the skin state and one or more instances of a personalized skincare recommendation. In an embodiment, the system includes a selectable skin condition indicator including computational circuitry configured to provide user-selectable instances of skin conditions on a display; and a selectable physiological cycle indicator including computational circuitry configured to provide user-selectable instances of physiological cycle phase or stage indicators on a display.

In an aspect, the present disclosure is directed to, among other things, a system for monitoring the onset of a skin condition. In an embodiment, the system includes means for determine an onset of a change in a skin state responsive to one or more inputs indicative of a physiological cycle progression. In an embodiment, the system includes means for generating a personalized skincare recommendation responsive to one or more inputs indicative of the onset of the change in the skin state. In an embodiment, the system includes means for generating a one or more instances of the skin state and one or more instances of the personalized skincare recommendation. In an embodiment, the system includes means for generating user-selectable input menus including one or more user-selectable physiological cycle phase choices and one or more user-selectable current skin state choices. In an embodiment, the system includes means for updating a predicted skin state and one or more instances of the personalized skincare recommendations on a graphical user interface responsive to an inputted user-selected physiological cycle phase choice or a user-selected current skin state choice.

In an aspect, the present disclosure is directed to, among other things, a method of ameliorating adverse effects of physiological cycle changes on human skin. In an embodiment, the method includes predicting an onset of a change in a skin state responsive to one or more inputs indicative of physiological cycle phase. In an embodiment, the method includes generating a personalized skincare recommendation responsive to predicting the onset of a change in a skin state. In an embodiment, the method includes displaying one or more instances of a predicted skin state and one or more instances of a personalized skincare recommendation on graphical user interface. In an embodiment, the method includes generating user-selectable input menus including one or more user-selectable physiological cycle phase choices and one or more user-selectable current skin state choices. In an embodiment, the method includes updating a predicted skin state and one or more instances of the personalized skincare recommendations on a graphical user interface responsive to an inputted user-selected physiological cycle phase choice or a user-selected current skin state choice.

In an aspect, the present disclosure is directed to, among other things, a method for recommending a product to a user. In an embodiment, the method includes predicting an onset of a change in a skin state responsive to one or more user-specific inputs regarding a skin and wellness state, one or more inputs indicative of a preference of a characteristic of a product; and one or more user-specific inputs indicative of physiological cycle phase. In an embodiment, the method includes recommending a product to the subject based on the one or more user-specific inputs regarding a skin and wellness state, the one or more inputs indicative of the preference of the characteristic of the product, and one or more user-specific inputs indicative of physiological cycle phase.

Figure 1:
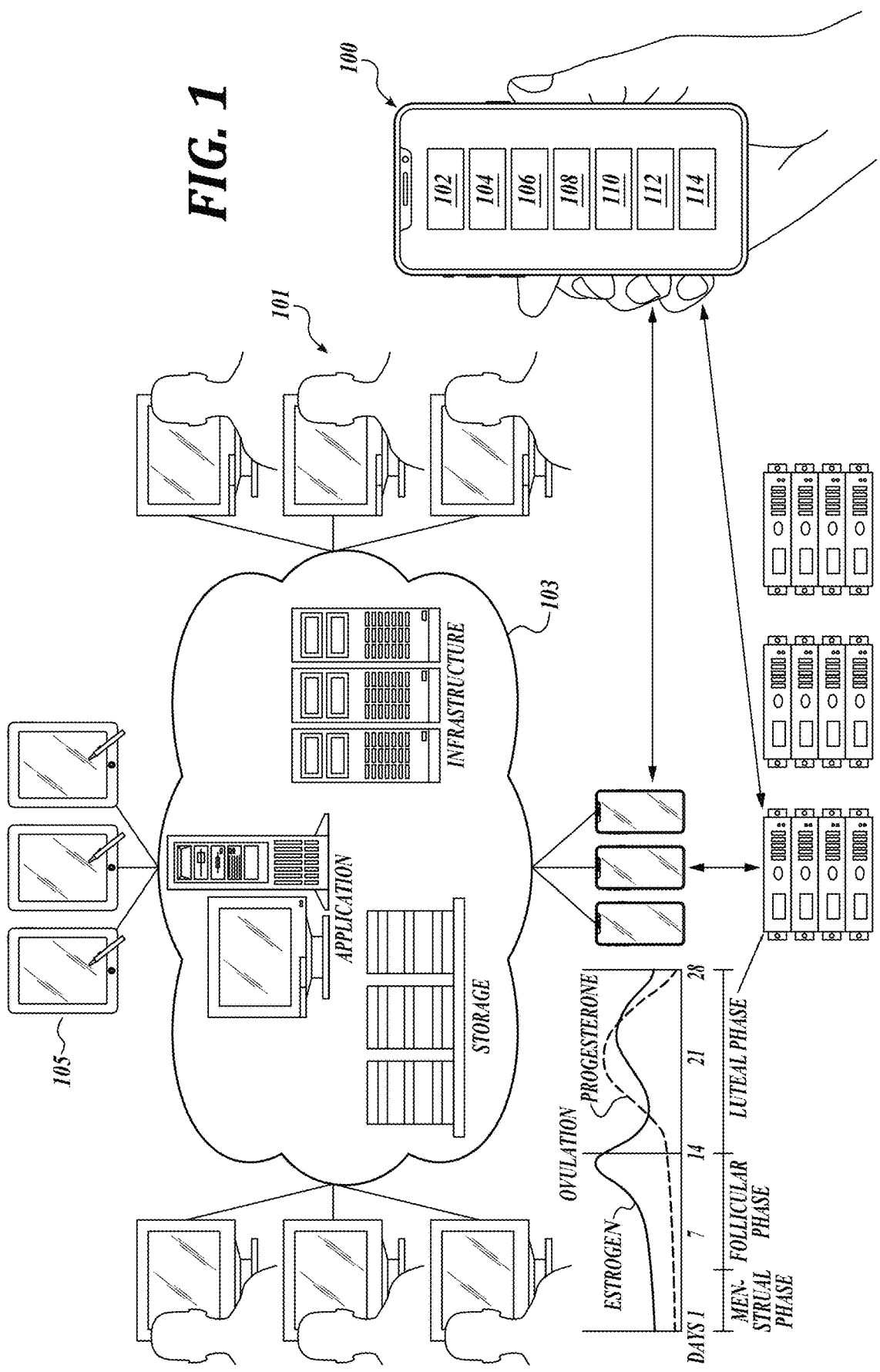
FIG. 1 is a schematic view of a system according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

DETAILED DESCRIPTION

The epidermis is significantly impacted by cyclical changes in estrogen, progesterone, and testosterone throughout the menstrual cycle. These cyclical fluctuations in the relative levels of these hormones result in changes in skin physiology including those due to changes in collagen and elastin production, sebum production, skin lipids levels, skin cell turnover rates, skin hydration, and the like.

Accordingly, in an embodiment, the present disclosure details one or more methodologies or technologies that determine an onset of a skin state based on an indication of a physiological cycle phase, and provide a personalized recommendation based on the determined onset of the skin state. In an embodiment, the present disclosure details one or more methodologies or technologies for monitoring the onset of a skin condition associated with a stage of a physiological cycle. In an embodiment, the present disclosure details one or more methodologies or technologies for ameliorating adverse effects of physiological cycle changes on human skin.

FIG. 1 shows a system 100 in which one or more methodologies or technologies can be implemented such, for example, determining an onset of a skin state based on an indication of a physiological cycle phase, and providing a personalized recommendation based on the determined onset of the skin state.

In an embodiment, the system 100 includes a skin-state unit 102 including computational circuitry configured to determine an onset of a change in a skin state responsive to one or more inputs indicative of a physiological cycle progression. For example, in an embodiment, the skin-state unit 102 includes computational circuitry configured to determine an onset of an acne-prone skin state, a congested skin state, dehydrated skin state, dull skin state, increased sensitivity skin state, irritated skin state, itchy skin state, sensitive skin state, changes in sebum production skin state, acne outbreak skin state, and the like, responsive to one or more inputs indicative of a physiological cycle progression. In an embodiment, the skin-state unit 102 includes computational circuitry configured to determine an onset of a skin state associated with cyclical changes in collagen production, skin thickness, skin hydration, sweat production, acne levels, and the like.

In an embodiment, the skin-state unit 102 includes computational circuitry configured to determine the onset of the change in the skin state responsive to one or more inputs indicative of a physiological cycle stage or phase. In an embodiment, the skin-state unit 102 includes computational circuitry configured to determine the onset of the change in the skin state responsive to one or more inputs indicative of whether a user is a cycle beginning, cycle middle, or a cycle ending stage.

No-limiting examples of computational circuitry include, among other things, one or more computing devices such as a processor (e.g., a microprocessor, a quantum processor, a qubit processor, etc.), a central processing unit (CPU), a digital signal processor (DSP), an application-specific integrated circuit (ASIC), a field programmable gate array (FPGA), and the like, or any combinations thereof, and can include discrete digital or analog circuit elements or electronics, or combinations thereof. In an embodiment, computational circuitry includes one or more ASICs having a plurality of predefined logic components. In an embodiment, computational circuitry includes one or more FPGAs, each having a plurality of programmable logic components.

In an embodiment, computational circuitry includes one or more electric circuits, printed circuits, flexible circuits, electrical conductors, electrodes, cavity resonators, conducting traces, ceramic patterned electrodes, electro-mechanical components, transducers, and the like.

In an embodiment, computational circuitry includes one or more components operably coupled (e.g., communicatively, electromagnetically, magnetically, ultrasonically, optically, inductively, electrically, capacitively coupled, wirelessly coupled, and the like) to each other. In an embodiment, computational circuitry includes one or more remotely located components. In an embodiment, remotely located components are operably coupled, for example, via wireless communication. In an embodiment, remotely located components are operably coupled, for example, via one or more communication modules, receivers, transmitters, transceivers, and the like.

In an embodiment, computational circuitry includes memory that, for example, stores instructions or information. For example, in an embodiment, the skin-state unit 102 includes computer-readable memory media having user-specific physiological cycle information configured as a data structure, the user-specific physiological cycle information including one or more of cycle beginning data, cycle end data, cycle-dependent skin state data, skincare regimen data, skincare product date, overall wellness data, diet data, medication data, environmental condition data, or stress level data. In an embodiment, the skin-state unit 102 includes computer-readable memory media having skin type information including balance skin information, combination skin information, dry skin information, normal skin information, oily skin information, sensitive skin information, and the like configured as a data structure. Non-limiting examples of memory include volatile memory (e.g., Random Access Memory (RAM), Dynamic Random Access Memory (DRAM), and the like), non-volatile memory (e.g., Read-Only Memory (ROM), Electrically Erasable Programmable Read-Only Memory (EEPROM), Compact Disc Read-Only Memory (CD-ROM), and the like), persistent memory, and the like. Further non-limiting examples of memory include Erasable Programmable Read-Only Memory (EPROM), flash memory, and the like. In an embodiment, memory is coupled to, for example, one or more computing devices by one or more instructions, information, or power buses.

In an embodiment, computational circuitry includes one or more computer-readable media drives, interface sockets, Universal Serial Bus (USB) ports, memory card slots, and the like, and one or more input/output components such as, for example, a graphical user interface, a display, a keyboard, a keypad, a trackball, a joystick, a touch-screen, a mouse, a switch, a dial, and the like, and any other peripheral device. In an embodiment, computational circuitry includes one or more user input/output components that are operably coupled to at least one computing device configured to control (electrical, electromechanical, software-implemented, firmware-implemented, or other control, or combinations thereof) at least one parameter associated with, for example, determining one or more tissue thermal properties responsive to detected shifts in turn-ON voltage.

In an embodiment, computational circuitry includes a computer-readable media drive or memory slot that is configured to accept signal-bearing medium (e.g., computer-readable memory media, computer-readable recording media, and the like). In an embodiment, a program for causing a system to execute any of the disclosed methods can be stored on, for example, a computer-readable recording medium, a signal-bearing medium, and the like. Non-limiting examples of signal-bearing media include a recordable type medium such as a magnetic tape, floppy disk, a hard disk drive, a Compact Disc (CD), a Digital Video Disk (DVD), Blu-Ray Disc, a digital tape, a computer memory, and the like, as well as transmission type medium such as a digital or an analog communication medium (e.g., a fiber optic cable, a waveguide, a wired communications link, a wireless communication link (e.g., receiver, transmitter, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, and the like.

In an embodiment, computational circuitry includes acoustic transducers, electroacoustic transducers, electrochemical transducers, electromagnetic transducers, electromechanical transducers, electrostatic transducers, photoelectric transducers, radio-acoustic transducers, thermoelectric transducers, ultrasonic transducers, and the like.

In an embodiment, the system 100 includes circuitry configured to implement a discovery and a registration protocol that allows system 100 and remote components, device, network servers, client devices, or the like to find each other and initiate one or more authorization protocols. For example, in an embodiment, the system 100 includes one or more receivers, transmitters, transceivers, transmission logic, reception logic, and the like for implementing authentication protocols and for securing communication between the system 100 and remote networks 101, servers 103, client device 105, and the like. In an embodiment, the system 100 includes circuitry configured to implement one or more security protocols to establish a communications links, channels, paths, or the like for providing secure communications between units and the like.

In an embodiment, computational circuitry includes electrical circuitry operably coupled with a transducer (e.g., an actuator, a motor, a piezoelectric crystal, a Micro Electro Mechanical System (MEMS), etc.) In an embodiment, computational circuitry includes electrical circuitry having at least one discrete electrical circuit, electrical circuitry having at least one integrated circuit, or electrical circuitry having at least one application specific integrated circuit. In an embodiment, computational circuitry includes electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs.

In an embodiment, the skin-state unit 102 includes computational circuitry configured to determine the onset of the change in the skin state responsive to one or more inputs indicative of whether a user is a Follicular phase or a Luteal phase. In an embodiment, the skin-state unit 102 includes computational circuitry configured to determining a current physiological state associated with the user based on one or more user-selectable inputs indicative of a physiological cycle phase and current skin state. In an embodiment, the skin-state unit 102 includes computational circuitry configured to predicting a current physiological cycle state associated with the user based on physiological cycle data associated with a user.

In an embodiment, the skin-state unit 102 includes computational circuitry configured to update physiological cycle state associated with the user based one or more actual physiological cycle data inputs associated with the user. In an embodiment, the skin-state unit 102 includes computational circuitry configured to determine the onset of the change in the skin state responsive to one or more inputs indicative of an overall wellness. In an embodiment, the skin-state unit 102 includes computational circuitry configured to determine the onset of the change in the skin state responsive to one or more inputs indicative of a stress level. In an embodiment, the skin-state unit 102 includes computational circuitry configured to determine the onset of the change in the skin state responsive to one or more inputs indicative of a medication.

In an embodiment, the skin-state unit 102 includes computational circuitry configured to determine the onset of the change in the skin state responsive to one or more inputs indicative of an environmental condition (e.g., climate, pollution, sun exposure, seasonal condition, and the like). In an embodiment, the skin-state unit 102 includes computational circuitry configured to determine the onset of the change in the skin state responsive to one or more inputs indicative of a change in diet. In an embodiment, the skin-state unit 102 includes computational circuitry configured to determine the onset of the change in the skin state responsive to one or more inputs indicative of a hormonal imbalance.

In an embodiment, the skin-state unit 102 includes computational circuitry configured to determine the onset of the change in the skin state responsive to one or more inputs indicative of user-specific potential risk factors for skin health.

In an embodiment, the system 100 includes a mitigation unit 104 including computational circuitry configured to generate a personalized skincare recommendation responsive to one or more inputs indicative of the onset of the change in the skin state. In an embodiment, the mitigation unit 104 includes computational circuitry configured to generate a personalized skincare recommendation to mitigate a decrease of sebum production responsive to one or more inputs indicative of an onset of a change in a skin state associated with a follicular phase. In an embodiment, the mitigation unit 104 includes computational circuitry configured to generate a personalized skincare recommendation to mitigate a dull, dry, lackluster, or sensitive skin state responsive to one or more inputs indicative of an onset of a change in a skin state associated with a follicular phase of a physiological cycle.

In an embodiment, the mitigation unit 104 includes computational circuitry configured to generate a give a personalized recommendation of product usage of current products. For example, "pump extra hydration cream the next few days as your skin is prone to dry skin," or "make sure to use your acne serum as you are more prone to acne."

In an embodiment, the mitigation unit 104 includes computational circuitry configured to give a personalized recommendation of product usage of current products. For example, "pump extra hydration cream the next few days as your skin is prone to dry skin," or "make sure to use your acne serum as you are more prone to acne."

In an embodiment, the mitigation unit 104 includes computational circuitry configured to generate a give a personalized recommendation based on one or more inputs indicative of a user-specific potential risk factors for skin health. In an embodiment, the mitigation unit 104 includes computational circuitry configured to generate a personalized skincare recommendation for a plump skin state or a cell-turnover-increase skin state responsive to one or more inputs indicative of an onset of a change in a skin state associated with a follicular phase of a physiological cycle.

In an embodiment, the mitigation unit 104 includes computational circuitry configured to generate a personalized skincare recommendation to mitigate an increase in a sebum production responsive to one or more inputs indicative of an onset of a change in a skin state associated with a luteal phase of a physiological cycle. In an embodiment, the mitigation unit 104 includes computational circuitry configured to generate a personalized skincare recommendation to mitigate an acne-production skin state responsive to one or more inputs indicative of an onset of a change in a skin state associated with a luteal phase of a physiological cycle. In an embodiment, the mitigation unit 104 includes computational circuitry configured to generate a personalized skincare recommendation responsive to one or more inputs indicative of the onset of an increase or decrease in sebum production. In an embodiment, the mitigation unit 104 includes computational circuitry configured to generate a personalized skincare recommendation responsive to one or more inputs indicative of a dull, dry, lackluster, or sensitive skin state.

In an embodiment, the mitigation unit 104 includes computational circuitry configured to generate a personalized skincare recommendation responsive to one or more inputs indicative of an onset of acne. In an embodiment, the mitigation unit 104 includes computational circuitry configured to generate a personalized skincare recommendation responsive to one or more inputs indicative of an onset of psoriasis, atopic eczema, or irritant dermatitis.

Progesterone stimulates the production of sebum and, as it rises, causes your skin to swell and compress your pores. This compression can lead to a build-up of oil and hormonal breakouts. Accordingly, in an embodiment, the mitigation unit 104 includes computational circuitry configured to generate a personalized skincare recommendation responsive to one or more inputs indicative of an onset of a change in sebum production. In an embodiment, the mitigation unit 104 includes computational circuitry configured to generate a personalized skincare recommendation responsive to one or more inputs indicative of the presence of excess sebum or clogged pores. In an embodiment, the mitigation unit 104 includes computational circuitry configured to generate a personalized skincare recommendation responsive to one or more inputs indicative of an onset of a change in progesterone levels.

In an embodiment, the mitigation unit 104 includes computational circuitry configured to generate a personalized skincare recommendation responsive to one or more inputs indicative of an onset of a change in estrogen and progesterone levels. (Testosterone remains constant throughout your cycle and takes the lead when estrogen and progesterone dip during menstruation. Like progesterone, testosterone activates the sebaceous glands, triggering them to produce more oil. The result: Excess sebum and clogged pores, both of which contribute to acne during menstruation.

In an embodiment, the system 100 includes a skin-state display unit 106 including computational circuitry configured to generate one or more instances of the skin state and one or more instances of the personalized skincare recommendation. In an embodiment, the skin-state display unit 106 includes computational circuitry configured to display at least one instances of the onset of a change in a skin state and to generate a respective personalized skincare recommendation associated with the at least one change in a skin state.

In an embodiment, the skin-state display unit 106 includes computational circuitry configured to display one or more instances of the skin state and one or more instances of a personalized skincare recommendation. In an embodiment, the skin-state display unit 106 includes computational circuitry configured to generate a virtual display on a graphical user interface one or more instances of the skin state and one or more instances of a personalized skincare recommendation.

In an embodiment, the system 100 includes a graphic user interface unit 108 including computational circuitry configured to generate a virtual input display including one or more instances of the skin state and one or more instances of a personalized skincare recommendation. In an embodiment, the system 100 includes a selectable skin condition indicator 110 including computational circuitry configured to provide user-selectable instances of skin conditions on a display; and a selectable physiological cycle indicator 112 including computational circuitry configured to provide user-selectable instances of physiological cycle phase or stage indicators on a display.

In an embodiment, the system 100 includes a real-time monitoring unit 114 including computational circuitry configured to determine whether to transmit a notification in response to one or more comparisons between user-specific physiological cycle information and predicted physiological cycle progression information.

Figure 2:
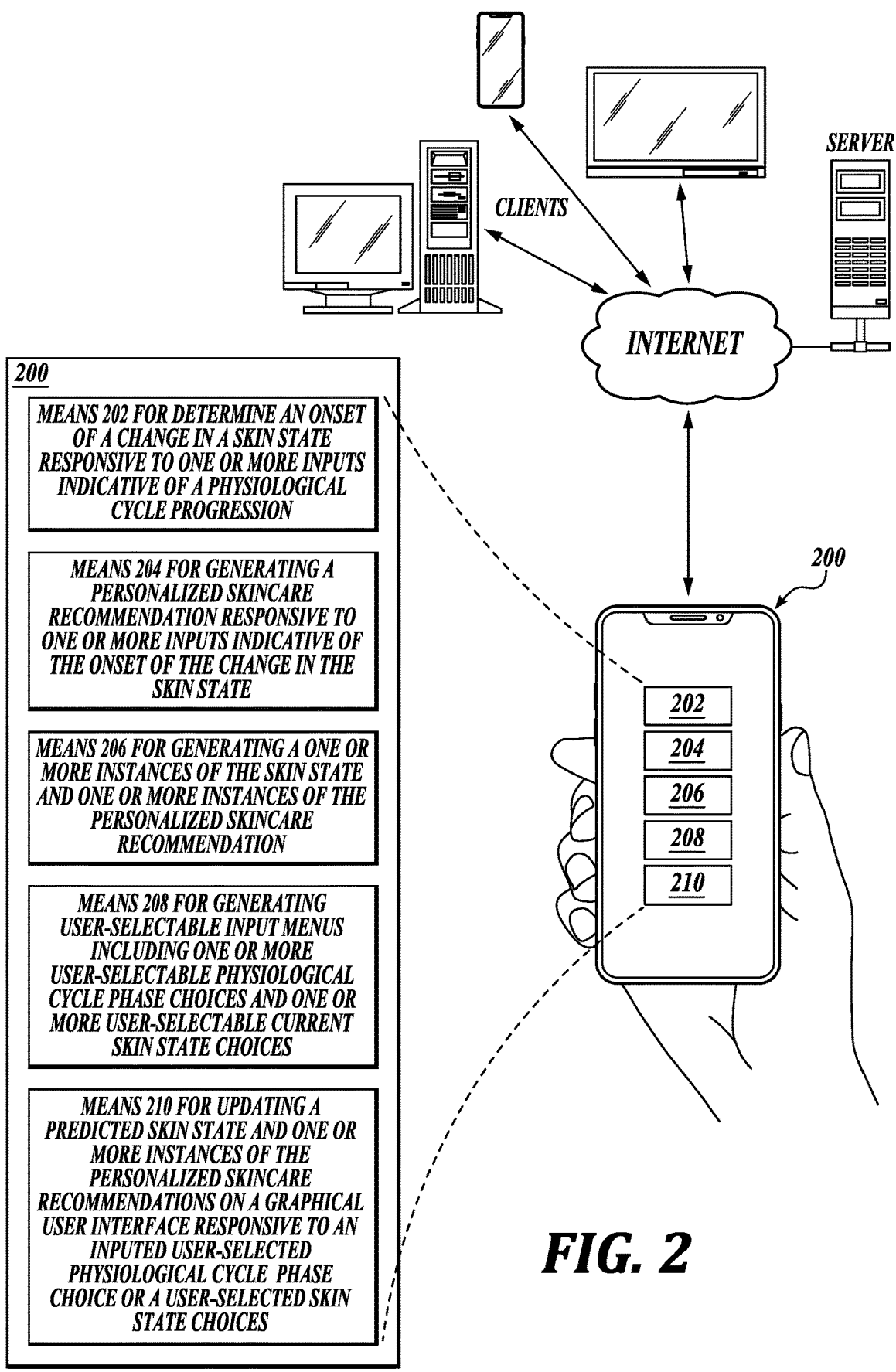
FIG. 2 is a schematic view of a system for monitoring the onset of a skin condition according to an embodiment.

Referring to FIG. 2, in an embodiment, a system 200 for monitoring the onset of a skin condition includes means 202 for determine an onset of a change in a skin state responsive to one or more inputs indicative of a physiological cycle progression.

In an embodiment, means 202 for determine an onset of a change in a skin state responsive to one or more inputs indicative of a physiological cycle progression includes or more computing devices such as a processor (e.g., a microprocessor, a quantum processor, qubit processor, etc.), a central processing unit (CPU), a digital signal processor (DSP), an application-specific integrated circuit (ASIC), a field programmable gate array (FPGA), and the like, or any combinations thereof, and can include discrete digital or analog circuit elements or electronics, or combinations thereof configured to determine an onset of a change in a skin state responsive to one or more inputs indicative of a physiological cycle progression. In an embodiment, computational circuitry includes one or more ASICs having a plurality of predefined logic components. In an embodiment, means 202 for determine an onset of a change in a skin state responsive to one or more inputs indicative of a physiological cycle progression includes one or more FPGAs, each having a plurality of programmable logic components.

In an embodiment, the system 200 includes means 204 for generating a personalized skincare recommendation responsive to one or more inputs indicative of the onset of the change in the skin state. In an embodiment, the means 204 for generating a personalized skincare recommendation responsive to one or more inputs indicative of the onset of the change in the skin state includes computer-readable memory media having user-specific physiological cycle information configured as a data structure, the user-specific physiological cycle information including one or more of cycle beginning data, cycle end data, cycle-dependent skin state data, skincare regimen data, skincare product date, overall wellness data, diet data, medication data, environmental condition data, or stress level data.

In an embodiment, the system 200 includes means 206 for generating a one or more instances of the skin state and one or more instances of the personalized skincare recommendation.

In an embodiment, the means 206 for generating a one or more instances of the skin state and one or more instances of the personalized skincare recommendation includes or more computing devices such as a processor (e.g., a microprocessor, a quantum processor, qubit processor, etc.), a central processing unit (CPU), a digital signal processor (DSP), an application-specific integrated circuit (ASIC), a field programmable gate array (FPGA), and the like, or any combinations thereof, and can include discrete digital or analog circuit elements or electronics, or combinations thereof configured to determine an onset of a change in a skin state responsive to one or more inputs indicative of a physiological cycle progression. In an embodiment, computational circuitry includes one or more ASICs having a plurality of predefined logic components. In an embodiment, means 206 for generating a one or more instances of the skin state and one or more instances of the personalized skincare recommendation includes one or more FPGAs, each having a plurality of programmable logic components configured to generate a one or more instances of the skin state and one or more instances of the personalized skincare recommendation.

In an embodiment, the system 200 includes means 208 for generating user-selectable input menus including one or more user-selectable physiological cycle phase choices and one or more user-selectable current skin state choices. In an embodiment, the means 208 for generating user-selectable input menus including one or more user-selectable physiological cycle phase choices and one or more user-selectable current skin state choices includes or more computing devices such as a processor (e.g., a microprocessor, a quantum processor, qubit processor, etc.), a central processing unit (CPU), a digital signal processor (DSP), an application-specific integrated circuit (ASIC), a field programmable gate array (FPGA), and the like, or any combinations thereof, and can include discrete digital or analog circuit elements or electronics, or combinations thereof configured to determine an onset of a change in a skin state responsive to one or more inputs indicative of a physiological cycle progression. In an embodiment, computational circuitry includes one or more ASICs having a plurality of predefined logic components. In an embodiment, the means 208 for generating user-selectable input menus including one or more user-selectable physiological cycle phase choices and one or more user-selectable current skin state choices includes one or more FPGAs, each having a plurality of programmable logic components configured to generate user-selectable input menus including one or more user-selectable physiological cycle phase choices and one or more user-selectable current skin state choices.

In an embodiment, the system 200 includes means 210 for updating a predicted skin state and one or more instances of the personalized skincare recommendations on a graphical user interface responsive to an inputted user-selected physiological cycle phase choice or user-selected current skin state choices. In an embodiment, the means 210 for updating a predicted skin state and one or more instances of the personalized skincare recommendations on a graphical user interface responsive to an inputted user-selected physiological cycle phase choice or a user-selected current skin state choices includes or more computing devices such as a processor (e.g., a microprocessor, a quantum processor, qubit processor, etc.), a central processing unit (CPU), a digital signal processor (DSP), an application-specific integrated circuit (ASIC), a field programmable gate array (FPGA), and the like, or any combinations thereof, and can include discrete digital or analog circuit elements or electronics, or combinations thereof configured to determine an onset of a change in a skin state responsive to one or more inputs indicative of a physiological cycle progression. In an embodiment, computational circuitry includes one or more ASICs having a plurality of predefined logic components. In an embodiment, the means 210 for updating a predicted skin state and one or more instances of the personalized skincare recommendations on a graphical user interface responsive to an inputted user-selected physiological cycle phase choice or a user-selected current skin state choices includes one or more FPGAs, each having a plurality of programmable logic components configured to update a predicted skin state and one or more instances of the personalized skincare recommendations on a graphical user interface responsive to an inputted user-selected physiological cycle phase choice or a user-selected current skin state choices.

In an embodiment, a method of ameliorating adverse effects of physiological cycle changes on human skin includes predicting an onset of a change in a skin state responsive to one or more inputs indicative of physiological cycle phase. In an embodiment, the method of ameliorating adverse effects of physiological cycle changes on human skin includes generate a personalized skincare recommendation responsive to predicting the onset of a change in a skin state. In an embodiment, the method of ameliorating adverse effects of physiological cycle changes on human skin includes displaying one or more instances of a predicted skin state and one or more instances of a personalized skincare recommendation on graphical user interface. In an embodiment, the method of ameliorating adverse effects of physiological cycle changes on human skin includes generating user-selectable input menus including one or more user-selectable physiological cycle phase choices and one or more user-selectable current skin state choices; and updating a predicted skin state and one or more instances of the personalized skincare recommendations on a graphical user interface responsive to an inputted user-selected physiological cycle phase choice or a user-selected current skin state choice.

Figure 3:
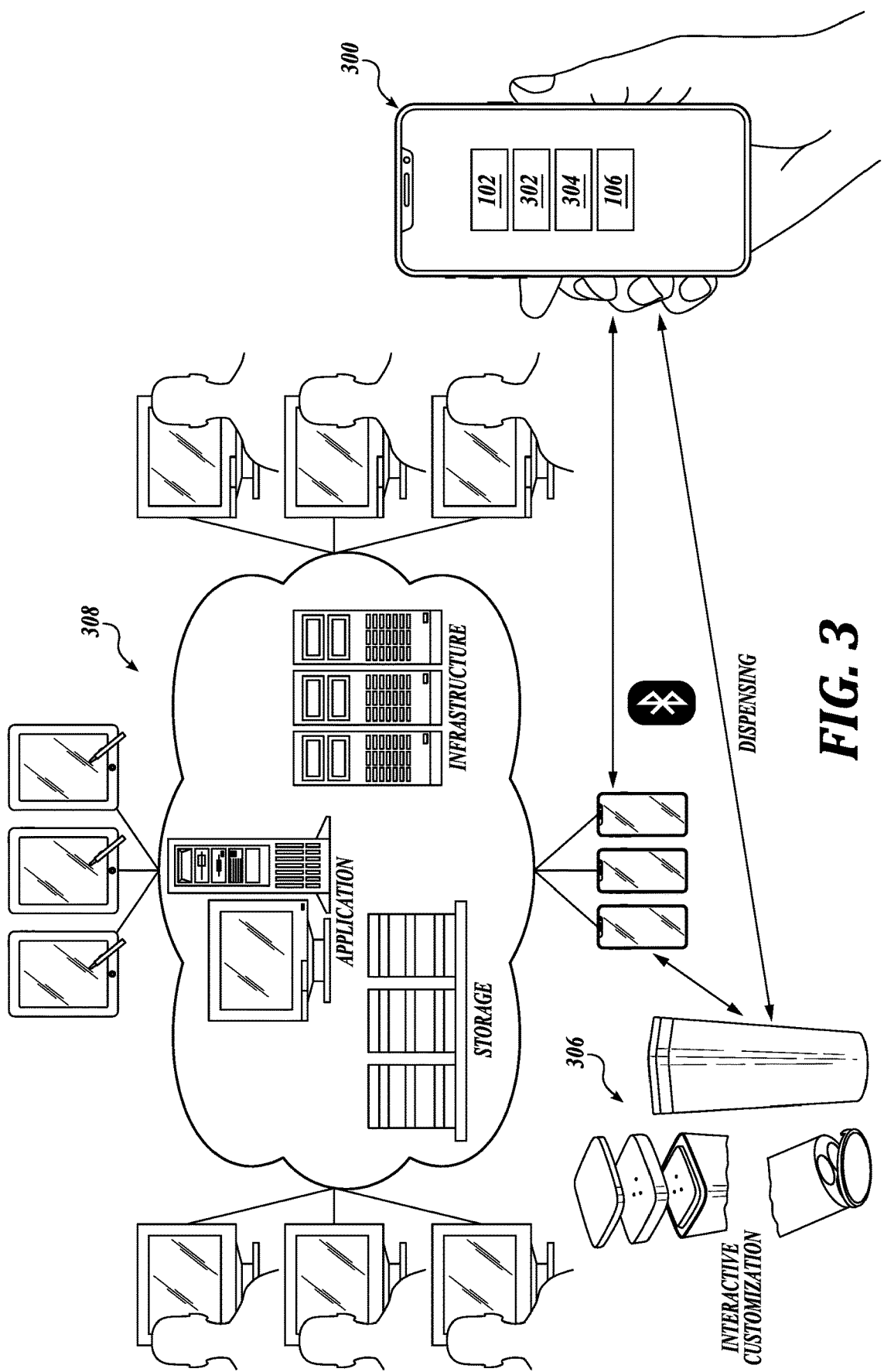
FIG. 3 is a schematic view of a personalized cosmetic system according to an embodiment.

In an embodiment, a method for recommending a product to a user includes predicting an onset of a change in a skin state responsive to one or more user-specific inputs regarding a skin and wellness state, one or more inputs indicative of a preference of a characteristic of a product; and one or more user-specific inputs indicative of physiological cycle phase. In an embodiment, a the method for recommending a product to a user includes recommending a product to the subject based on the one or more user-specific inputs regarding a skin and wellness state, the one or more inputs indicative of the preference of the characteristic of the product, and one or more user-specific inputs indicative of physiological cycle phase;

FIG. 3 shows a personalized cosmetic system 300 in which one or more methodologies or technologies can be implemented such, for example, generating personalized cosmetic product.

In an embodiment, personalized cosmetic system 300 includes a skin-state unit 102 including computational circuitry configured to determine an onset of a change in a skin state responsive to one or more inputs indicative of a physiological cycle progression. In an embodiment, personalized cosmetic system 300 includes a personalize product unit 302 including computational circuitry configured to generate a personalized skincare recommendation responsive to one or more inputs indicative of the onset of the change in the skin state.

In an embodiment, personalized cosmetic system 300 includes a dispenser control unit 304 including computational circuitry configured to establishing a communication link with a personalized cosmetic dispensing system 306 and to communicate one or more control commands to dispense a personalize skincare product in conformity with the generated personalized skincare recommendation. In an embodiment, the dispenser control unit 304 includes computational circuitry configured to establishing a communication link with a remote personalized cosmetic dispensing system 306 and exchange control command information.

In an embodiment, the dispenser control unit 304 includes computational circuitry configured to implement a discovery and a registration protocol that allows personalized cosmetic system 300 and a remote personalized cosmetic dispensing system 306 to find each other and initiate one or more authorization protocols. For example, in an embodiment, the personalized cosmetic system 300 includes one or more receivers, transmitters, transceivers, transmission logic, reception logic, and the like for implementing authentication In an embodiment, the dispenser control unit 304 includes at least one of a receiver, transmitter, or a transceiver operable to actuate a discovery protocol that allows personalized cosmetic system 300 and a remote apparatus 306 for dispensing cosmetic material to identify each other and negotiate one or more pre-shared keys. Examples of suitable apparatuses 306 for dispensing cosmetic material include those found in U.S. Pat. No. 9,808,071; which is incorporate herein by reference in its entirety. In an embodiment, personalized cosmetic system 300 includes a skin-state display unit 106 including computational circuitry configured to generate one or more instances of the skin state and one or more instances of a personalized skincare recommendation.

TABLE 1

| | | Estrogen | Progesterone |
|---|---|---|---|
| Action | | 1. Reduces sebum secretions from the sebaceous gland<br>2. Refines the texture and makes pores less visible<br>3. Prevents acne, dark spots, sagging, wrinkles, etc.<br>4. Facilitates blood flow and normalizes skin metabolism<br>5. Improves the blood circulation to hair papillae and stimulates hair growth<br>6. Promotes the development of the breasts and distinctive contours of a woman's bust and body.<br>7. Helps preserve bone mass | 1. Encourages the production and secretion of sebum<br>2. Thickens the corneal layer of the epidermis and lowers skin resistance to acne.<br>3. Encourages the production of melanin, the pigment in dark spots and suntan | https://www.educatedtherapists.com/tag/acne/page/2/ protocols and for securing communication between the personalized cosmetic system 300 and a personalized cosmetic dispensing system 306. In an embodiment, the system 100 includes circuitry configured to implement one or more security protocols to establish a communications links, channels, paths, or the like for providing secure communications between units, device, and the like.

In an embodiment, the personalized cosmetic system 300 includes circuitry configured to implement a discovery and a registration protocol that allows personalized cosmetic system 300 and remote components or devices 308 to find each other and initiate one or more authorization protocols (e.g., protocols that negotiate one or more pre-shared keys, public key based authentication protocols, internet protocol security authentication methods, etc.).

In embodiments the personalized cosmetic system 300 is realized using computational circuitry including a processor and a storing device such as a hard disc drive and a suitable application, a database application in a computer or it may be realized using cloud computing.

In an embodiment, the dispenser control unit 304 includes the dispenser control unit includes computational circuitry configured to establishing a communication link with a remote personalized cosmetic dispensing system 306 and exchanged personalize skincare product information.

In an embodiment, the dispenser control unit 304 includes computational circuitry configured to initiate a discovery protocol that allows the personalized cosmetic system and a remote personalized cosmetic dispensing system 306 to identify each other and negotiate one or more pre-shared keys. In an embodiment, the dispenser control unit 304 includes at least one of a receiver, transmitter, or a transceiver operable to actuate a discovery protocol that allows personalized cosmetic system 300 and a remote enterprise to identify each other and negotiate information.

Follicular Phase

Example 1: (Days 1-6)

Physiological Changes:
hormones levels at lowest
a decreases of sebum production and a deterioration of the moister-retention function
Skin State: dull, dry, lackluster, sensitive Example 2: (Days 7-14)

Physiological Changes:
estrogen production increases
stimulates collagen, elastin, hyaluronic acid
Skin State: plump, skin cell turnover increase
Recommended User Experience:
Ovulation phase
Luteal phase Example 3: (Days 15-24)

Physiological Changes:
estrogen levels plummet and progesterone starts to rise
progesterone activates sebum production
Skin State: skin tends to swell and pores to compress trapping oil and causing buildup that can lead to breakouts Example 4: (Days 25-28)

Physiological Changes:
Progesterone and estrogen dip below the level of testosterone, causing bloating, puffiness and an oversupply of oil
Skin State: hormonal acne symptoms. Oil residing within pores can mix with acne-causing bacteria and lead to an eruption of hormonal breakouts across chin and jawline.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. A system, comprising:
    a skin-state unit including computational circuitry configured to determine onset of changes in a skin state responsive to one or more inputs indicative of a menstrual cycle progression, wherein the menstrual cycle progression includes a follicular phase and a luteal phase, and wherein the changes in skin state include a decrease in sebum production and moisture retention in the follicular phase and an increase in sebum production in the luteal phase;
    a mitigation unit including computational circuitry configured to generate personalized skincare recommendations responsive to the determined changes in the skin state, wherein the personalized skincare recommendations include a hydration product recommendation to mitigate the decrease in sebum production and moisture retention in the follicular phase and an acne serum product recommendation to mitigate the increase in sebum production in the luteal phase;
    a dispenser control unit including computational circuitry configured to establish a secure communication link with a personalized cosmetic dispensing system and to communicate one or more control commands to cause the personalized cosmetic dispensing system to dispense personalized skincare products in conformity with the personalized skincare recommendations; and
    a skin-state display unit including computational circuitry configured to generate one or more instances of the skin state and one or more instances of the personalized skincare recommendation.

2. The system according to claim 1, wherein the skin-state unit further includes computational circuitry configured to determine a current menstrual state associated with a user based on one or more user-selectable inputs indicative of a physiological menstrual cycle phase and a current skin state.

3. The system according to claim 1, wherein the skin-state unit further includes computational circuitry configured to predict a current menstrual cycle state associated with a user based on menstrual cycle data associated with the user.

4. The system according to claim 1, wherein the skin-state unit further includes computational circuitry configured to update a menstrual cycle state associated with a user based on one or more actual menstrual cycle data inputs associated with the user.

5. The system according to claim 1, wherein the skin-state unit further includes computational circuitry configured to determine onset of changes in the skin state responsive to one or more inputs indicative of an overall wellness.

6. The system according to claim 1, wherein the skin-state unit further includes computational circuitry configured to determine onset of changes in the skin state responsive to one or more inputs indicative of a stress level.

7. The system according to claim 1, wherein the skin-state unit further includes computational circuitry configured to determine onset of changes in the skin state responsive to one or more inputs indicative of a medication.

8. The system according to claim 1, wherein the skin-state unit further includes computational circuitry configured to determine onset of changes in the skin state responsive to one or more inputs indicative of an environmental condition.

9. The system according to claim 1, wherein the skin-state unit further includes computational circuitry configured to determine onset of changes in the skin state responsive to one or more inputs indicative of a change in diet.

10. The system according to claim 1, wherein the skin-state unit further includes computational circuitry configured to determine onset of changes in the skin state responsive to one or more inputs indicative of a hormonal imbalance.

11. The system according to claim 1, wherein the mitigation unit further includes computational circuitry configured to generate the personalized skincare recommendation responsive to one or more inputs indicative of an onset of psoriasis, atopic eczema, or irritant dermatitis.

12. The system according to claim 1, wherein the skin-state display unit includes computational circuitry configured to display at least one instance of the changes in the skin state.

13. The system according to claim 1, wherein the skin-state display unit includes computational circuitry configured to display the one or more instances of the skin state and the one or more instances of the personalized skincare recommendation.

14. The system according to claim 1, wherein the skin-state display unit includes computational circuitry configured to generate a virtual display on a graphical user interface of the one or more instances of the skin state and the one or more instances of the personalized skincare recommendation.

15. The system according to claim 1, further comprising:
    a graphic user interface unit including computational circuitry configured to generate a virtual input display including the one or more instances of the skin state and the one or more instances of the personalized skincare recommendation.

16. The system according to claim 1, further comprising:
    a selectable skin condition indicator including computational circuitry configured to display user-selectable instances of skin conditions; and
    a selectable physiological cycle indicator including computational circuitry configured to display user-selectable instances of physiological cycle phase or stage indicators.

17. The system according to claim 1, further comprising:
    a real-time monitoring unit including computational circuitry configured to determine whether to transmit a notification in response to one or more comparisons between user-specific physiological cycle information and predicted physiological cycle progression information.

18. A system for monitoring onset of a skin condition, comprising:
    means for determining onset of changes in a skin state responsive to one or more inputs indicative of a menstrual cycle progression, wherein the menstrual cycle progression includes a follicular phase and a luteal phase, and wherein the changes in the skin state include a decrease in sebum production and moisture retention in the follicular phase and an increase in sebum production in the luteal phase;

means for generating personalized skincare recommendations responsive to the determined changes in the skin state, wherein the personalized skincare recommendations include a hydration product recommendation to mitigate the decrease in sebum production and moisture retention in the follicular phase and an acne serum product recommendation to mitigate the increase in sebum production in the luteal phase;

means for establishing a secure communication link with a personalized cosmetic dispensing system and communicating one or more control commands to cause the personalized cosmetic dispensing system to dispense personalized skincare products in conformity with the personalized skincare recommendations; and means for generating one or more instances of the skin state and one or more instances of the personalized skincare recommendation.

19. The system of claim 18, further comprising:

means for generating user-selectable input menus including one or more user-selectable physiological cycle phase choices and one or more user-selectable current skin state choices; and means for updating a predicted skin state and one or more instances of the personalized skincare recommendations on a graphical user interface responsive to an inputted user-selected physiological cycle phase choice or a user-selected current skin state choice.

20. A method of ameliorating adverse effects of physiological cycle changes on human skin, comprising:

predicting onset of changes in a skin state responsive to one or more inputs indicative of menstrual cycle phases, wherein the menstrual cycle phases include a follicular phase and a luteal phase, and wherein the changes in the skin state include a decrease in sebum production and moisture retention in the follicular phase and an increase in sebum production in the luteal phase;

generating personalized skincare recommendations responsive to the predicted changes in the skin state, wherein the personalized skincare recommendations include a hydration product recommendation to mitigate the decrease in sebum production and moisture retention in the follicular phase and an acne serum product recommendation to mitigate the increase in sebum production in the luteal phase;

establishing a secure communication link with a personalized cosmetic dispensing system and communicating one or more control commands to cause the personalized cosmetic dispensing system to dispense personalized skincare products in conformity with the personalized skincare recommendations; and displaying one or more instances of the predicted changes in the skin state and one or more instances of the personalized skincare recommendation on a graphical user interface.

21. The method of claim 20, further comprising:

generating user-selectable input menus including one or more user-selectable physiological cycle phase choices and one or more user-selectable current skin state choices; and updating the skin state and one or more instances of the personalized skincare recommendations on the graphical user interface responsive to an inputted user-selected physiological cycle phase choice or a user-selected current skin state choice.

22. A method for recommending a product to a user, comprising predicting an onset of a change in a skin state responsive to one or more user-specific inputs regarding a skin and wellness state, one or more inputs indicative of a preference of a product characteristic; and one or more user-specific inputs indicative of menstrual cycle phases, wherein the menstrual cycle phases include a follicular phase and a luteal phase, and wherein the changes in the skin state include a decrease in sebum production and moisture retention in the follicular phase and an increase in sebum production in the luteal phase;

recommending products to the user based on the one or more user-specific inputs regarding the skin and wellness state, the one or more inputs indicative of the preference of the product characteristic, and the one or more user-specific inputs indicative of the menstrual cycle phases, wherein the recommended products include a hydration product recommendation to mitigate the decrease in sebum production and moisture retention in the follicular phase and an acne serum product recommendation to mitigate the increase in sebum production in the luteal phase; and establishing a secure communication link with a personalized cosmetic dispensing system and communicating one or more control commands to cause the personalized cosmetic dispensing system to dispense the recommended products.

\* \* \* \* \*